(12) United States Patent
Brydegaard

(10) Patent No.: US 11,536,849 B2
(45) Date of Patent: Dec. 27, 2022

(54) HIGH RESOLUTION MOLECULAR LIDAR

(71) Applicant: NEOLund AB, Lund (SE)

(72) Inventor: Mikkel Brydegaard, Lund (SE)

(73) Assignee: NEOLund AB, Lund (SE)

( * ) Notice: Subject to any disclaimer, the term of this patent is extended or adjusted under 35 U.S.C. 154(b) by 391 days.

(21) Appl. No.: 16/623,749

(22) PCT Filed: Jul. 14, 2018

(86) PCT No.: PCT/SE2018/050769
§ 371 (c)(1),
(2) Date: Dec. 17, 2019

(87) PCT Pub. No.: WO2019/013699
PCT Pub. Date: Jan. 17, 2019

(65) Prior Publication Data
US 2020/0217969 A1  Jul. 9, 2020

(30) Foreign Application Priority Data

Jul. 14, 2017 (SE) .................................... 1730197-9
Mar. 21, 2018 (SE) .................................... 1830093-9

(51) Int. Cl.
*G01S 17/95* (2006.01)
*G01N 21/39* (2006.01)
(Continued)

(52) U.S. Cl.
CPC .............. *G01S 17/95* (2013.01); *G01N 21/39* (2013.01); *G01N 21/45* (2013.01); *G01N 21/47* (2013.01);
(Continued)

(58) Field of Classification Search
CPC .......... G01S 17/95; G01S 7/481; G01S 17/10; G01N 21/39; G01N 21/45; G01N 21/47;
(Continued)

(56) References Cited

U.S. PATENT DOCUMENTS 4,988,190 A  1/1991  Miles
5,026,991 A  6/1991  Goldstein et al.
(Continued)

FOREIGN PATENT DOCUMENTS

CN  106772432 A  *  5/2017  ............. G01S 17/89
CN  108761486 A  *  11/2018  ............. G01S 17/95
(Continued)

OTHER PUBLICATIONS

Mei, "Remote Sensing of Atmospheric Aerosol and Gas Using Scheimpflug Lidar (SLidar) Based on Diode Lasers", Progress In Electromagnetic Research Symposium, 2016.
(Continued)

*Primary Examiner* — Mohamed K Amara
(74) *Attorney, Agent, or Firm* — Knobbe, Martens, Olson & Bear, LLP

(57) ABSTRACT

The present disclosure provides a Scheimpflug LIDAR apparatus for detecting a property of a gas comprising: a light source configured to emit a light along at least a first axis, a light detection arrangement, and an optical configuration fulfilling the Scheimpflug condition and Hinge rule. The light source comprises an expander aperture, and wherein the expander aperture and light detection arrangement are configured such that: a spot size of the emitted light along the first axis is matched to a pixel footprint of pixels configured to receive light from corresponding distances along the first axis, and an effective range resolution of at least one column of pixels or probe volume deteriorates linearly with respect to the range.

9 Claims, 2 Drawing Sheets

(51) Int. Cl.
  *G01N 21/47* (2006.01)
  *G01S 7/481* (2006.01)
  *G01N 21/45* (2006.01)
  *G01N 21/53* (2006.01)
(52) U.S. Cl.
  CPC ............ *G01N 21/532* (2013.01); *G01S 7/481* (2013.01); *G01N 2021/398* (2013.01); *G01N 2021/399* (2013.01); *G01N 2021/4709* (2013.01)
(58) Field of Classification Search
  CPC .......... G01N 21/532; G01N 2021/398; G01N 2021/399; G01N 2021/4709; G01N 2021/1795; G01N 2021/354; G01N 2021/394; G01N 21/538; G01N 21/3504; Y02A 90/10
  See application file for complete search history.

(56) References Cited

U.S. PATENT DOCUMENTS

| | | | |
|---|---|---|---|
| 5,331,409 A | 7/1994 | Thurtell et al. | |
| 5,373,160 A | 12/1994 | Taylor | |
| 5,627,635 A * | 5/1997 | Dewan | G01B 11/24 356/627 |
| 5,905,567 A * | 5/1999 | Dewan | G01B 11/024 356/613 |
| 10,028,657 B2 * | 7/2018 | Friedman | A61B 5/0036 |
| 11,169,272 B2 * | 11/2021 | Brydegaard | G01N 21/538 |
| 2003/0019933 A1 * | 1/2003 | Tsikos | G02B 19/0085 235/454 |
| 2006/0007981 A1 * | 1/2006 | Clary | G02B 9/34 372/107 |
| 2007/0002448 A1 * | 1/2007 | Nunes Vicente Rebordao | G03F 7/70408 359/577 |
| 2007/0047836 A1 * | 3/2007 | Pan | G01P 5/26 382/280 |
| 2007/0081162 A1 | 4/2007 | Roller et al. | |
| 2009/0061381 A1 * | 3/2009 | Durbin | A61C 13/0004 433/213 |
| 2010/0014088 A1 * | 1/2010 | Wiki | G01N 21/253 356/432 |
| 2010/0128269 A1 * | 5/2010 | Chinowsky | G01N 21/553 356/369 |
| 2011/0164783 A1 | 7/2011 | Hays | |
| 2011/0317147 A1 | 12/2011 | Campbell et al. | |
| 2012/0050750 A1 * | 3/2012 | Hays | G01P 5/26 356/519 |
| 2012/0170043 A1 | 7/2012 | Rao | |
| 2013/0314694 A1 | 11/2013 | Tchoryk et al. | |
| 2014/0125776 A1 * | 5/2014 | Damaskinos | G01N 21/47 348/50 |
| 2015/0077761 A1 * | 3/2015 | Yamagata | G01B 11/25 356/601 |
| 2015/0233962 A1 | 8/2015 | Tchoryk | |
| 2015/0285743 A1 * | 10/2015 | Tung | G01N 21/8806 356/369 |
| 2017/0026633 A1 * | 1/2017 | Riza | H04N 13/211 |
| 2019/0170314 A1 * | 6/2019 | Lenef | F21S 41/176 |
| 2020/0217791 A1 | 7/2020 | Brydegaard | |

FOREIGN PATENT DOCUMENTS

| | | | |
|---|---|---|---|
| EP | 1014070 A2 * | 6/2000 | ............ G01M 11/37 |
| WO | WO-2004088363 A1 * | 10/2004 | ........ G03F 7/70408 |
| WO | WO 08096524 | 8/2008 | |
| WO | WO 2010 026579 | 3/2010 | |
| WO | WO 2012 105973 | 8/2012 | |
| WO | WO-2021122885 A1 * | 6/2021 | ............ G01N 21/33 |

OTHER PUBLICATIONS

Zhao et al., "Inelastic Hyperspectral lidar for profiling aquatic ecosystems", Laser & Photonics Reviews, pp. 1-7, 2016.
Mei et al., "Continuous-wave differential absorption lidar", Laser & Photonics Reviews, vol. 9, No. 6, pp. 629-636, 2015.
Extended European Search Report received in European Application No. 18831597.2 (P3473EP00) dated Feb. 10, 2021 in 8 pages.
Mei, Liang & Brydegaard, Mikkel, "Atmospheric aerosol monitoring by an elastic Scheimpflug Lidar system", Optics Express vol. 23., No. 24 (2015). Published Oct. 27, 2015.
Brydegaard, M., Gebru, A. and Svanberg, S., Super Resolution, Laser Radar with Blinking Atmospheric Particles—Application to Interacting Flying Insects:, Prog. Electromagn. Res., vol. 147, pp. 141-151 (2014).
Rydhmer, K. & Strand, A., Applied hyperspectral LIDAR for monitoring fauna dispersal in aquatic Environments:, Division of Combustion Physics, Lund Reports on Combustion Physics, LRCP-196, Lund University, May 2016. ISNR LUTFD2/TFC-196-SE, ISSN 1102-8718.
Brydegaard, M., Elin Malmqvist, Samuel Jansson, Jim Larsson, Sandra Torok, Guangyu Zhao, "The Scheimpflug lidar method," Proc. SPIE 10406, Lidar Remote Sensing for Environmental Monitoring 2017, 104060I (Aug. 30, 2017); doi 10.117/12.2272939; Sections 2.2-2.3.
International Search Report dated Sep. 12, 2018 for International Patent Application No. PCT/SE2018/050769, filed Jul. 14, 2018.
International Search Report dated Sep. 10, 2018 for International Patent Application No. PCT/SE2018/050768 filed Jul. 14, 2018.
Written Opinion dated Sep. 12, 2018 for International Patent Application No. PCT/SE2018/050769, filed Jul. 14, 2018.
Written Opinion dated Sep. 10, 2018 for International Patent Application No. PCT/SE2018/050768, filed Jul. 14, 2018.

* cited by examiner

HIGH RESOLUTION MOLECULAR LIDAR

TECHNICAL FIELD

The present disclosure relates to laser projection systems and more particularly to Scheimpflug LIDAR systems and methods.

BACKGROUND ART

A LIDAR or laser radar is an optical device for detection and ranging with applications in a very broad range of environments, from industrial combustion furnaces to ecosystem monitoring. In contrast to the now wide-spread topographical LIDAR systems which detect and range hard targets, atmospheric LIDARs have sufficient sensitivity to retrieve a continuous molecular echo from entirely clean air.

Atmospheric LIDARs have been around for several decades and they have been extensively applied to vertical profiles of aerosols in the troposphere. They are typically implemented in containers or trucks and comprise systems weighting several tons. Smaller commercial systems weighing several hundred kilograms have also been developed. The cost of such systems is approximately 1 Euro per gram of equipment. The conventional method used by such systems relies on Time-of-Flight (ToF) principles with expensive and bulky pulsed neodymium-doped yttrium aluminium garnet lasers of several hundred kilograms. The laser provide high peak powers (~100 MW) but the system has poor resolution in time and space (approx. ~1 minute and ~50 m). Elastic aerosol LIDAR systems are exceedingly challenging to calibrate and yield very little specificity for the aerosols sensed unless they are expanded by $N_2$ and $O_2$ Raman channels. Raman channels only work during night time, are very noisy and require even longer averaging times of typically 10 minutes to produce a usable signal.

A highly specific atmospheric LIDAR method is the Differential Absorption LIDAR (DIAL). In this method, a pulsed tuneable laser targets specific molecular absorption lines and concentration profiles of a gas can be acquired. In practice, high peak powers (MW), short pulses (ns), narrow bands (<pm) and tunability contradict each other. Such DIAL systems typically require a small team of PhDs in laser physics to run. Some progress has been reported on lighter and smaller DIAL systems using micro-LIDAR, but still with time resolution in the order of 10 minutes. As a consequence, DIAL systems are immensely expensive and there are only a handful operational on a global basis. The low resolution, the cost and the bulkiness of DIAL systems prevent many practical applications such as industrial process optimization and mapping of greenhouse gas sources and fluxes.

There exists a need for a LIDAR method sufficiently sensitive enough to allow profiling, mapping and visualization of the exhausted $O_2$-hole from a single breath, e.g., with a resolution of millimetres, and capable of operating within milliseconds. This would allow the capture of the exhaust plume as it flies by, and the determination of the exhaust temperature.

Known problems with existing atmospheric LIDAR systems include the limitations on the optical performance. For example, existing systems may suffer from non-linear and ambiguous range dependency, ghosting and optical artefacts, and poor collection efficiency. A solution is needed to address and overcome these limitations in order to advance the technology and make it practically competitive on the market.

SUMMARY

It is an objective of the disclosure to at least partly overcome one or more of the above-identified limitations of the prior art. One or more of these objectives, as well as further objectives that may appear from the description below, are at least partly achieved by means of a method for data processing, a computer readable medium, devices for data processing, and an optical apparatus according to the independent claims, embodiments thereof being defined by the dependent claims.

A first aspect of the disclosure provides a device for detecting a property of a gas comprising: a light source configured to emit a light along at least a first axis, a light detection arrangement comprising: a lens arrangement having a lens plane, a displaced image plane, and a front focal plane, and being configured to direct the light from the light source and scattered by the gas to a light sensor, the light sensor comprising at least one column of pixels aligned to an image plane and configured to output a sensor signal, wherein the first axis, the lens plane, and the image plane intersect such that a Scheimpflug condition is achieved, wherein the displaced image plane, the front focal plane of the lens arrangement, and a relationship between the light source and the light detection arrangement fulfil the Hinge rule intersection, and wherein the light source comprises an expander aperture, and wherein the expander aperture and lens arrangement are configured such that:

a spot size of the emitted light along the first axis is matched to a pixel footprint of pixels configured to receive light from corresponding distances along the first axis, and an effective range resolution of at least one column of pixels or probe volume deteriorates linearly with respect to the range. The dimensions of the light source may be matched with the respective focal lengths of the pixels of the at least one column of pixels. The light source may be configured to emit a sheet of light along at least the first axis, wherein the thickness of light sheet, in combination with the focal length of the lens arrangement, is matched to the pixel width of the pixels of the at least one column of pixels. The light source may be one or more of; a narrowband single-mode source, a broad band multi-mode source, a high power multimode diode laser, a high power multimode fibre laser, a high power tapered amplifier seeded by a tuneable single mode diode laser, a high-power fibre amplifier seeded by a tuneable single mode diode laser, and a high power tuneable $CO_2$ laser. The light sensor may comprise a transmissive layer and wherein the lens arrangement being configured to direct modulated light scattered by the gas on to the transmissive layer at Brewster's angle such that P-polarized light is transmitted through the transmissive layer of light sensor. The light sensor may be configured to only detect P-polarized light and wherein the light source is configured to emit polarized light. The light source may comprise a polarization rotation controller comprising at least one of: a liquid crystal, a Pockels cell, and an arrangement comprising a super position of a plurality of emitters with orthogonal polarizations in combination with a polarization beam splitter. The lens arrangement may comprise at least one of: an imaging lens comprising one or more light refracting components, and a mirror lens comprising a catadioptric optical system. Preferably, a data processing device is employed to process the sensor signal to determine a property of the gas.

In another aspect of the disclosure, a method is provided for detecting a property of a gas comprising: emitting a light along at least a first axis, generating a sensor signal using a detection arrangement comprising: a lens arrangement having a lens plane, a displaced image plane, and a front focal plane, and being configured to direct the light from the light source and scattered by the gas to a light sensor, the light sensor comprising at least one column of pixels aligned to an image plane and configured to output a sensor signal, wherein the first axis, the lens plane, and the image plane intersect such that a Scheimpflug condition is achieved, and wherein the displaced image plane, the front focal plane of the lens arrangement, and a relationship between the light source and the light detection arrangement fulfil the Hinge rule intersection wherein the light source comprises an expander aperture, and wherein the expander aperture and lens arrangement are configured such that:

a spot size of the emitted light along the first axis is matched to a pixel footprint of pixels configured to receive light from corresponding distances along the first axis, and an effective range resolution of at least one column of pixels or probe volume deteriorates linearly with respect to the range.

BRIEF DESCRIPTION OF DRAWINGS

These and other aspects, features and advantages of which examples of the invention are capable of will be apparent and elucidated from the following description of examples of the present invention, reference being made to the accompanying drawings, in which.

DETAILED DESCRIPTION OF EXAMPLE EMBODIMENTS

The present disclosure proposes a LIDAR imaging apparatus configured according to a Scheimpflug condition. The Scheimpflug condition states that, in a scenario where the object plane is tilted, the entire plane can be imaged in focus if the lens plane and image plane intersects the object plane at the same point. Since the Scheimpflug condition does not relate to the focal length of the lens, an additional constraint, the Hinge rule, must be fulfilled to obtain focus. The Hinge rule states that the intersection of the front focal plane of the lens, the object plane, and the image plane displaced to the effective centre of the lens must coincide.

An understanding achieved by the inventor is that, for a LIDAR system, the laser illuminated air or water volume may be the "object plane", the "imaging lens" may be a Newtonian telescope, and that the "image plane" may be a linear CMOS array detector.

Figure 1:
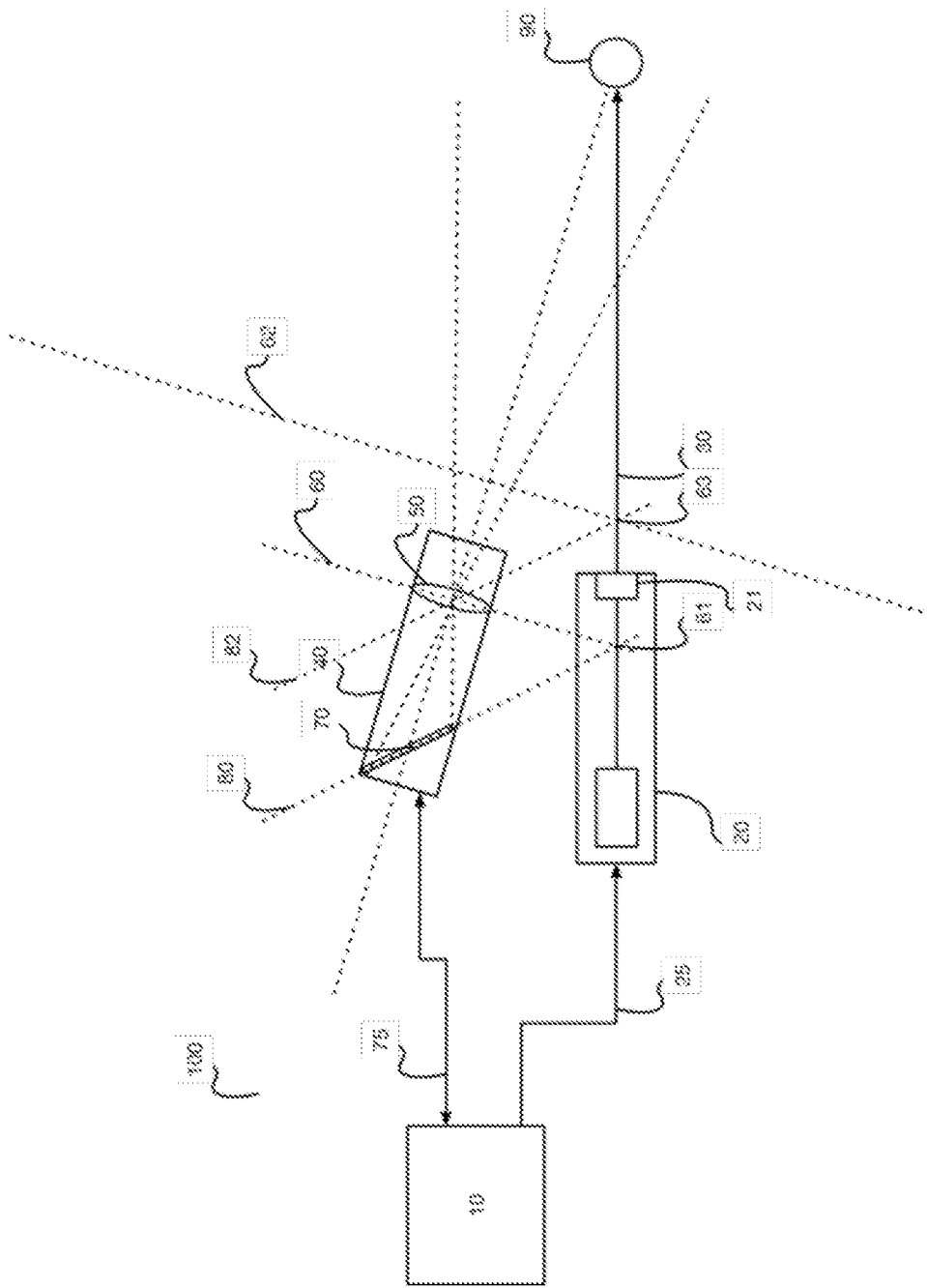
FIG. 1 shows an apparatus according to an embodiment of the disclosure.

FIG. 1 shows an embodiment of the disclosure with a device 100 for detecting a property of a gas. The device 100 comprises a light source 20 configured to emit a light along at least a first axis 30, and a light detection arrangement 40. The light source may comprise one or more of; a narrowband single-mode source, a broad band multi-mode source, a high power multimode diode laser, a high power multimode fibre laser, a high power tapered amplifier seeded by a tuneable single mode diode laser, a high-power fibre amplifier seeded by a tuneable single mode diode laser, and a high power tuneable $CO_2$ laser. The light source comprises a wavelength $\lambda$ and a width, $\ell_{DL}$.

The light source 20 comprises an expander configured to provide a spot size of the emitted light along the first axis. The expander has f-number F/#, expander aperture 21, $\varnothing_{exp}$, and focal length, $f_{exp}$. In one configuration, expander F/# is kept constant, thus the focal length of the expander varies along with the aperture. Further configuration of the expander aperture will be described later.

The light detection arrangement 40 comprises a lens arrangement 50 having a lens plane 60, a displaced image plane 82, and a front focal plane 62. The light detection arrangement 40 is configured to direct the light scattered back from the gas to the light sensor 70. The first axis 30, the lens plane 60, and the image plane 80 intersect such that a Scheimpflug condition 61 is achieved. The displaced image plane 82, the front focal plane 62 of the lens arrangement 50, and a relationship between the light source 20 and the light detection arrangement 40 fulfil the Hinge rule intersection 63. Preferably, the displaced image plane 82, the front focal plane 62 of the lens arrangement 50, and first axis 30 intersect to achieve the Hinge rule intersection 63.

The lens arrangement 50 may comprise at least one of: an imaging lens comprising one or more light refracting components, and a mirror lens comprising a catadioptric optical system. The lens arrangement 50 comprises an f-number F/#, aperture, $\varnothing_{rec}$ and focal length, $f_{rec}$.

In one embodiment, lens arrangement 50 is configured to provide a pixel footprint of pixels configured to receive light from corresponding distances along the first axis. A pixel footprint is defined as the volume covered by an individual pixel. The expander aperture 21 and lens arrangement 50 are configured such that:

1) a spot size of the emitted light along the first axis is matched to a pixel footprint of pixels configured to receive light from corresponding distances along the first axis, and 2) an effective range resolution of at least one column of pixels or probe volume deteriorates linearly with respect to the range measured by the corresponding pixels or probe volume.

In an embodiment, the dimensions of the light source 20 are matched with the respective focal lengths of the pixels of at least one column of pixels. Preferably, the light source 20 is configured to emit a sheet of light along at least the first axis 30, wherein the thickness of light sheet, in combination with the focal length of the lens arrangement 50, is matched to the pixel width of the pixels of at least one column of pixels. In one embodiment, light sensor 70 with size 200×14 um is provided and a light sheet with thickness of 200 um is transmitted.

The light sensor 70 is preferably a linear CMOS array detector and may comprise of at least one column of pixels aligned to an image plane 80. The light sensor 70 is further configured to output a sensor signal 75. Light sensor 70 has a sensor length ($\ell_{sens}$), Sensor tilt ($\theta$), and a number of pixels. The pixels have a pixel height ($\ell_{pix}$), and pixel height ($w_{pix}$).

The apparatus further comprises a data processing device (10) configured to drive light source 20 and to process the sensor signal to determine a property of the gas. Data processing device 10 drives light source 20 to emit light along a first axis 30. The light travels along axis 30 until being scattered back towards light detection arrangement 40 by a particle 90. The scattered light passes through detection arrangement 40 and is received at sensor 70. A sensor signal 75 is generated by sensor 70 and transmitted to data processing device 10 for processing.

After employing both the Scheimpflug principle and the Hinge rule, a number of design parameters remain for consideration. The apparatus may be designed with the following variables in mind: The transmitter-receiver baseline separation distance, $\ell_{BL}$, the receiver focal length, $f_{rec}$, and the tilt of the sensor with respect to the lens plane 60, θ. The transmitter-receiver baseline separation distance is defined as the perpendicular distance between lens arrangement 50 and first axis 30. The receiver focal length is defined as the perpendicular distance between lens plane 60 and front focal plane 62.

Improved range resolution may be accomplished by providing a longer baseline, $\ell_{BL}$, and longer receiver focal length, $f_{rec}$. In some embodiments, $\ell_{BL}$ may have a value of between 5 cm and 100 cm. In some embodiments, $f_{rec}$ may have a value of between 5 cm and 500 cm.

For infinity focused Scheimpflug LIDAR, the near field or closest probe volume, $z_{near}$, is given by $z_{near} \approx \ell_{BL} \cdot f_{rec} / (\ell_{sens} \cdot \cos\theta)$, where $\ell_{sens}$ is the length of the detector array. Depending on the choice of components, the image of the backscattered air volume may or may not be captured entirely within the pixel height. In LIDAR, this is referred to as the range of complete overlap, $z_{complete}$. At ranges beyond $z_{complete}$, the volumetric echo from a clear homogeneous media is flat. In cases where $z_{complete} > z_{near}$, the volumetric echo is attenuated in the close range. The range of complete overlap is given by:

$$z_{complete} = \frac{\phi_{exp}}{\frac{\ell_{pix}}{f_{rec}} - \frac{\ell_{LD}}{f_{exp}} + \frac{\phi_{exp}}{z_{term}}}$$

where, $\phi_{exp}$ is the transmitter expander aperture, $\ell_{pix}$ is the pixel height, $\ell_{LD}$ is laser diode emitted width, $f_{exp}$ is focal length of the laser expander and $z_{term}$ is the termination distance where the laser is focused. The above equation gives negative range for the case when beam and field-of-view, FoV, are entirely overlapping. When applying reciprocal optics paradigm to the pixels, a perspective of matching brightness/divergence can be imposed on the beam and the FoV. Therefore the relation:

$$\ell_{pix}/f_{rec} \approx \ell_{LD}/f_{exp}$$

maximizes the LIDAR efficiency and the signal-to-background ratio. Therefore, in one embodiment, the spot size of the emitted light along the first axis may be 'matched' to a pixel footprint of pixels when the apparatus is configured such that the pixel height divided by the focal length of the receiver is approximately equal to the laser diode emitted width divided by the focal length of the laser expander.

In one embodiment, sensor pixels height have a range of 1 μm to 1 mm and preferably 200 μm and the laser diode has an emitted width of 5 μm and 1 mm and preferably 200 μm.

In certain configurations, the width of the beam in Scheimpflug LIDAR increases the angular spread. A larger angular spread of light across the pixel footprints introduces a ranging uncertainty. In one configuration, a beam expander having a small aperture is used to produce a narrow beam at close range. However, the short focal length of the beam expander and diffraction from the small aperture may produce a highly divergent beam. Therefore, a beam expander having a small aperture may generate a broad beam at far range, resulting in poor ranging certainty. In an alternative configuration, a beam expander having a large aperture is used. A beam expander having a large aperture may broaden the beam and worsen the resolution at close range. However, at longer ranges, the beam may converge down to diffraction limit, which improves range resolution across a specific range. This range may be configured to be a range determined to be most desirable for the application. E.g. 1-3 km for a waste gas detection apparatus. In a further configuration, emitting light through a medium sized telescope can potentially place the far field limit well beyond the troposphere.

In one embodiment, the air volume analysed by the probe extends from the LIDAR apparatus to a point $z_{term}$ approximately 6 km distant from the LIDAR apparatus. The air volume is discretized into voxels: 700 voxels along the beam (z), 100 voxels across the beam parallel to baseline (y), and 50 voxels perpendicular to baseline and beam (x). The beam at the expander ($B_{x,y,0}$), may have a Gaussian profile with Full width at half maximum (FWHM) equal to half aperture.

Figure 2:
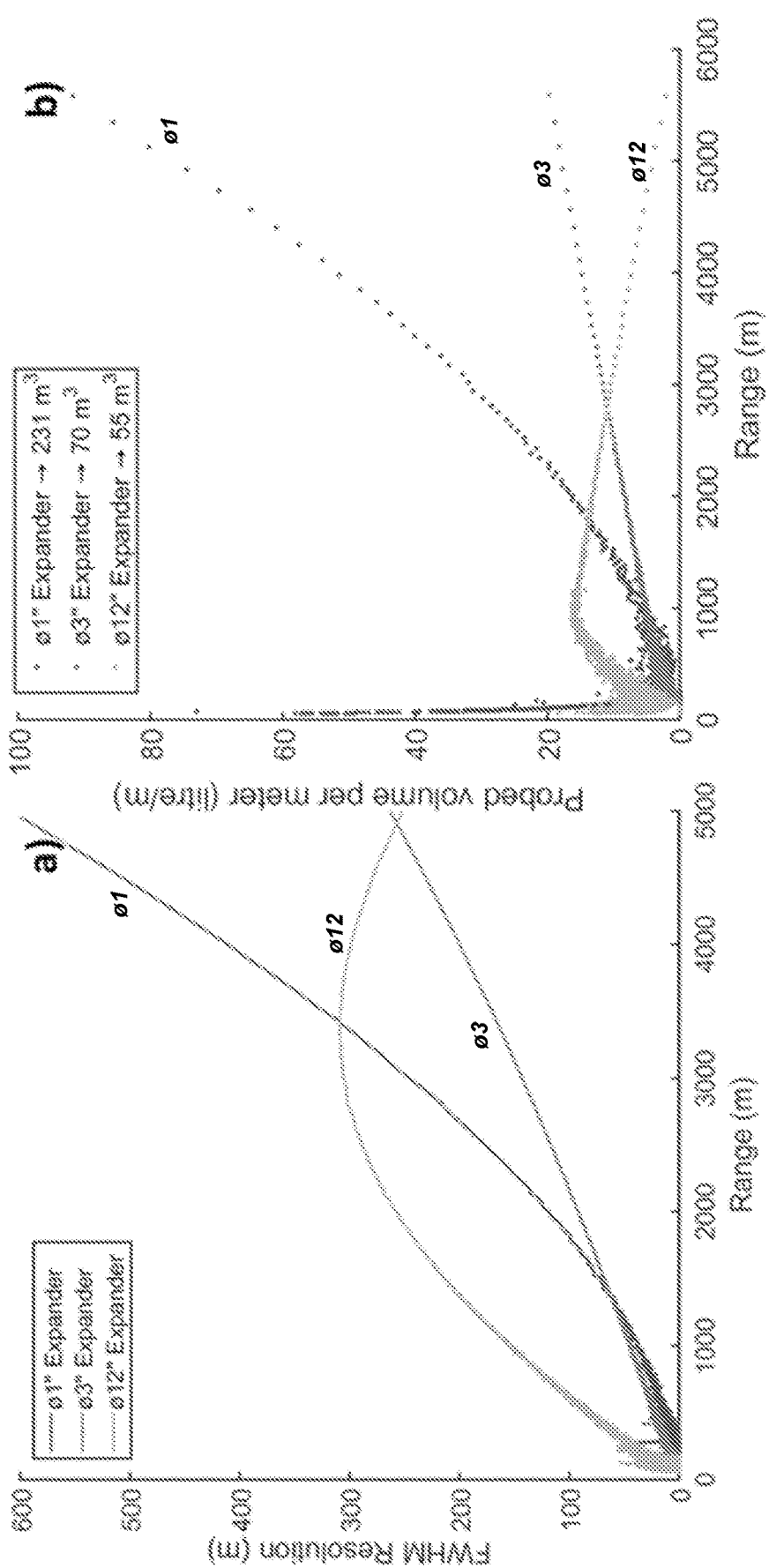
FIGS. 2a and 2b shows graphs of apparatus range resolution with respect to range.

FIG. 2a shows the consequences of particular expander aperture sizes. In the graph of FIG. 2a, an expander of F/#=5 with different expander aperture sizes are used. When the expander aperture is too small (ø1") then range resolution deteriorates quadratically with range. When an optimal expander aperture (ø3") is chosen, the range resolution deteriorates linearly. When the expander size is too large (ø12"), range resolution becomes a sad parabola and the resolution is lowest at a point half way to the termination.

In FIG. 2b, the range dependent probe volumes are shown for the same configurations shown in FIG. 2a. As shown in FIG. 2b, the larger expander can also detrimentally affect the range resolution and careful design can allow for a linear behaviour of the probe volume, but also optimized range behaviour at specific distances where range resolution is to be maximized.

The effective probe width and the entire probe volume can be evaluated by multiplying voxel volume exceeding half sensitivity maxima (FWHM). Optimal expander aperture size may be determined in dependence on not only the linear deterioration of range resolution but also the linear increase of probe volume.

In one embodiment, probe volume size may be determined in dependence on a requirement for counting sparse organisms. In particular, the range dependent probe volume size is important since detection limits for differently sized organisms decrease by $z^{-2}$.

The pixel footprint at the termination, $z_{term}$, can be estimated from magnification of the tilted pixel pitch, the laser spot size at $z_{term}$ is given by diffraction limited Gaussian beam waist. Consequently the pixel footprint and the laser spot size are matched by choosing $\phi_{exp}$ accordingly:

$$\phi_{exp} = \frac{2 \cdot \lambda \cdot f_{rec}}{\pi \cdot w_{pix} \cdot \cos\theta}$$

In an embodiment, data processing device 10 is configured to operate according to the following steps:

Step 1: Process sensor signal 75 to determine signal S when the light source is activated, and determine background signal B when the light source is not activated.

Step 2: Normalise signal S using background signal B. In one embodiment, background signal B is subtracted from signal S.

Step 3: Apply appropriate threshold and corrections for non-constant range dependency. The result of step 2 is the intensity as a function of pixel number. This must be converted to intensity as a function of range. Consequently, this step comprises the transformation of the raw intensity-as-a-function-of-pixel-number signal to intensity-as-a-function-of-range.

Step 4: Process the intensity-as-a-function-of-range signal to determine the presence of particles.

Step 5: Process the output of step 4 to apply segmentation or cluster identification of "volumes of interest".

Step 6: Correlate presents results with previously determined results for noise reduction and/or to provide temporal information with respect to the results.

Step 7: Go to step 1.

The data processing device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an ND converter. The special-purpose software may be provided to the data processing device 10 on any suitable computer-readable medium, including a record medium and a read-only memory. The discrimination of co- and de-polarized light in LIDAR may provide microstructural information about LIDAR targets. Single scattering aerosol LIDAR may be defined as a type of atmospheric LIDAR sensitive to receive echoes from clean air. In single scattering aerosol LIDAR, the depolarization ratio (DoLP), which is defined as the intensity ratio between the perpendicular component and the parallel component of Raman scattered light, can differentiate between spherical and edgy or irregularly-shaped particles such as droplets and ice crystals respectively.

In multiple scattering targets, defined as targets in which photons interact multiple times through photon migration with the media before exiting and returning to the receiver optics, polarimetric LIDAR can differentiate between specular reflections from the surface and diffuse reflections which have undergone photon migration inside of the medium.

In some configurations, the light sensor is configured to optimally receive light at normal incidence. Light by the detector may decrease with incidence angle as: $\sim\cos^m\theta$, $m \geq 1$ (Lambertian). This only applies to random polarized light however. For P-polarized light, the light received at the light sensor may increase with angle, peaking at Brewster's angle. Therefore, in one embodiment, the detector is tilted at an angle corresponding to the Brewster angle relative to the polarization axis for the emitted polarized light. Preferably, the light sensor further comprises a transmissive layer and the lens arrangement is configured to direct modulated light scattered by the gas on to the transmissive layer at Brewster's angle such that P-polarized light is transmitted through the transmissive layer of light sensor. The transmissive layer may be a linear polarizer configured to reject S-polarized light to minimize stray light received at the detector. In some embodiments, the light sensor is configured to only detect P-polarized light.

In one embodiment, the polarization of the transmitted light is altered, rather than relying entirely on detection of polarisation on the detection side. In this embodiment, two substantially identical laser diodes are superimposed with a polarization beam splitter. One of the lasers is fitted with a $\frac{1}{2}\lambda$ waveplate causing the polarization to rotate 90°. The light from each laser diode is combined into a single beam having light substantially polarised according to either a first axis or a second axis 90° from the first axis. At the detector, a polarising filter is provided in one orientation. The intensity of received light is measured when one laser is used. The intensity of received light is then measured when the other laser with the $\frac{1}{2}\lambda$ waveplate is used. The ratio between the two measured intensities provides the depolarization ratio.

In an alternative embodiment, polarization discrimination can also be implemented by means of a beam splitter at detection in combination with two detectors.

In some embodiments, the light source 20 comprises a polarization rotation controller comprising at least one of: a liquid crystal, a Pockels cell, and an arrangement comprising a super position of a plurality of emitters with orthogonal polarizations in combination with a polarization beam splitter.

In another aspect, the Scheimpflug LIDAR method is tailored for optimal resolution at short range, by changing the size of the optics. In one embodiment, a high resolution, short-range Scheimpflug LIDAR is provided for analysing industrial and combustion processes. In this embodiment, inexpensive high power GaN blue and violet lasers at 445 nm (3 W) and 405 nm (1 W) respectively may be employed. In one embodiment, the base-line separation $\ell_{BL}$ is configured to be 22 cm, $f_{rec}$ is 200 mm and the phi is 2". In this embodiment, the testing range may be 8 m and may provide millimetre spatial resolution. A sample rate of 4 kHz may be deployed. Such an embodiment may be used for studying e.g. turbulent sprays, flame environments, and other high spatial and temporal resolution applications.

The present invention has been described above with reference to specific embodiments. However, other embodiments than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A device for detecting a property of a gas comprising:
a light source configured to emit a light along at least a first axis, and
a light detection arrangement comprising:
a lens arrangement having a lens plane, a displaced image plane, and a front focal plane, and being configured to direct the light from the light source and scattered by the gas to a light sensor, and
the light sensor comprising at least one column of pixels aligned to an image plane and configured to output a sensor signal,
wherein the first axis, the lens plane, and the image plane intersect such that a Scheimpflug condition is achieved,
wherein the displaced image plane, the front focal plane of the lens arrangement, and a relationship between the light source and the light detection arrangement fulfil the Hinge rule intersection,
wherein the light source comprises an expander aperture providing an effective range resolution of at least one column of pixels or a probe volume that deteriorates linearly with respect to range, and
wherein the expander aperture and the lens arrangement are configured such that a spot size of the light emitted along the first axis is matched to a pixel footprint of pixels configured to receive light from corresponding distances along the first axis, and
wherein dimensions of the light source are matched with respective focal lengths attributable to the pixels of the at least one column of pixels.

2. The device of claim 1, wherein the light source is configured to emit a sheet of light along at least the first axis, wherein a thickness of the sheet of light, in combination with a focal length of the lens arrangement, is matched to a pixel width of the pixels of the at least one column of pixels.

3. The device of claim 1, wherein the light source is one or more of; a narrowband single-mode source, a broad band multi-mode source, a high power multimode diode laser, a high power multimode fibre laser, a high power tapered amplifier seeded by a tuneable single mode diode laser, a high-power fibre amplifier seeded by a tuneable single mode diode laser, and a high power tuneable $CO_2$ laser.

4. The device of claim 1, wherein the light sensor comprising a transmissive layer and wherein the lens arrangement being configured to direct modulated light scattered by the gas on to the transmissive layer at Brewster's angle such that P-polarized light is transmitted through the transmissive layer of light sensor.

5. The device of claim 4, wherein light sensor is configured to only detect P-polarized light and wherein the light source is configured to emit polarized light.

6. The device of claim 5, wherein the light source comprises a polarization rotation controller comprising at least one of: a liquid crystal, a Pockels cell, and an arrangement comprising a super position of a plurality of emitters with orthogonal polarizations in combination with a polarization beam splitter.

7. The device of claim 1, wherein the lens arrangement comprises at least one of:
an imaging lens comprising one or more light refracting components, and
a mirror lens comprising a catadioptric optical system.

8. The device of claim 1, further comprising a data processing device implemented on a general-purpose or special-purpose computing device and configured to:
process the sensor signal to determine a property of the gas.

9. A method for detecting a property of a gas comprising:
emitting a light from a light source along at least a first axis, and
generating a sensor signal using a detection arrangement comprising:
a lens arrangement having a lens plane, a displaced image plane, and a front focal plane, and being configured to direct the light from the light source and scattered by the gas to a light sensor, and
the light sensor comprising at least one column of pixels aligned to an image plane and configured to output a sensor signal,
wherein the first axis, the lens plane, and the image plane intersect such that a Scheimpflug condition is achieved,
wherein the displaced image plane, the front focal plane of the lens arrangement, and a relationship between the light source and the detection arrangement fulfil the Hinge rule intersection,
wherein the light source comprises an expander aperture providing an effective range resolution of at least one column of pixels or a probe volume that deteriorates linearly with respect to range, and
wherein the expander aperture and the lens arrangement are configured such that a spot size of the light emitted along the first axis is matched to a pixel footprint of pixels configured to receive light from corresponding distances along the first axis, and
wherein a dimension of the light source is matched with a respective focal length attributable to the pixels of the at least one column of pixels.

* * * * *